Figure 1:
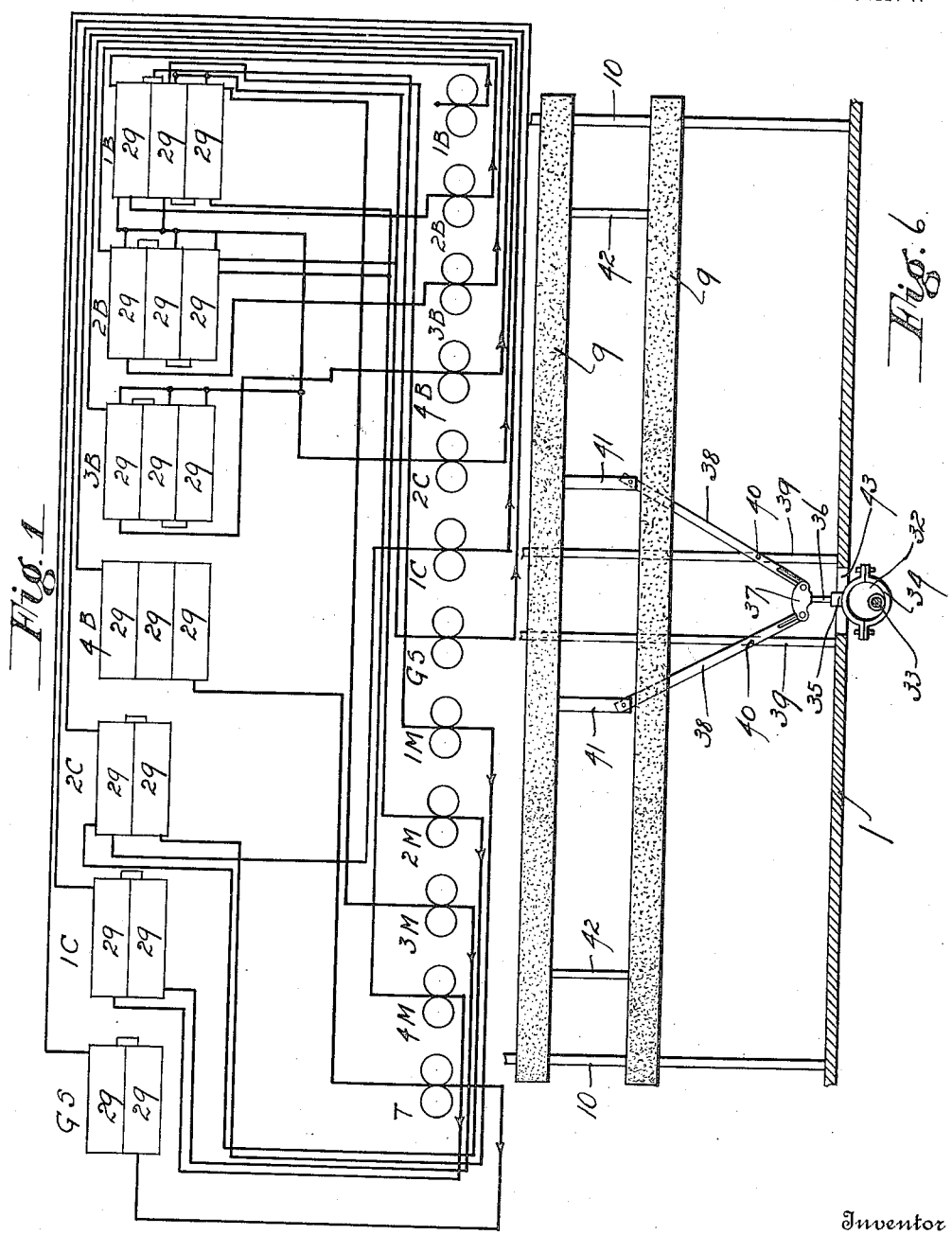

UNITED STATES PATENT OFFICE.

GEORGE T. SMITH, OF DALLAS, TEXAS.

FLOUR PURIFIER AND DRIER.

1,154,067.           Specification of Letters Patent.      Patented Sept. 21, 1915.

Application filed February 3, 1913. Serial No. 745,869.

*To all whom it may concern:*

Be it known that I, GEORGE T. SMITH, a citizen of the United States, residing at Dallas, in the county of Dallas and State of Texas, have invented certain new and useful Improvements in Flour Purifiers and Driers, of which the following is a specification.

My invention relates to apparatus for purifying flour during the manufacture thereof, and the objects are to simplify the process of manufacturing flour, to avoid excessive milling, to clear the flour of poisonous and other matter, to save more wheat out of the bran, to increase the output of first grade flour, and to bleach the flour by an air process. The middlings purifiers and sieves in common use, as separate machines, are dispensed with and the purifying is accomplished or carried out at every step in the manufacture of flour. In the old processes, the efforts were to avoid much fiber, that is, to avoid grinding much of the fibrous material, because it could not be separated from the flour, and it would pass through with the flour. For this reason much of the wheat was wasted in the bran.

One of the objects of this invention is to provide means for removing ground fiber so that the wheat may be ground more and thus more wheat separated from the bran whereby much more of the wheat will be saved than in the old processes.

One of the most important objects of this invention is to remove the black substance which is found in much of the wheat. During the growth of the wheat there is a duct substantially through the center of the berry longitudinally through which the food sucked from the earth and the air is fed to the berry and the food which is not digested remains in this duct after maturity of the berry and becomes a black substance, and when the wheat is ground this substance becomes a fine powder and is thoroughly mixed with the flour and is materially lighter than the flour. This black substance is known to be poisonous and should be removed from the flour and the object is to provide means for removing this fine black powder after each grinding of the wheat and to keep the wheat and flour dry so that the powder can with certainty be removed.

Another object is to avoid excessive milling. The flour that is light enough to float in the air is dead and this is caused by over-milling. The cellular formation has been destroyed and there are no gas cells in which yeast may enter,—hence such flour will not be affected by yeast in cooking. This destruction is brought about by passing through a maze of machinery, such as mills, sieves, purifiers, elevators, and chutes.

One object of this invention is to dispense with much of the machinery in the manufacture of flour.

There is an advantage in removing the fibrous material from the head of the machine before it passes down in the rolls and that is, it requires less power to drive the rolls. The fibrous material is removed in the first grading machine it reaches after being ground. The same kind of a process removes the black powder. As the stock passes through a mill, some of the wheat is made into flour and some of the black substance is released and reduced to a fine powder; consequently when the flour reaches the first grading machine after being ground, the released black powder is removed and the flour and wheat pass on for further action. In this manner the impurities are prevented from passing on mixed with the flour. At every passage of the stock through a set of rollers, more of the black substance is released and is taken out by the next grading machine before it passes to another set of rollers. The same thing is done with other impurities, such as fibrous material. Another object is to provide a thorough drying of the flour by warmed air and consequently a bleaching of the flour is accomplished without damage to the flour and without another operation for bleaching. The flour is further treated repeatedly with light for thorough bleaching.

Other objects and advantages will be fully explained in the following description, and the invention will be more particularly pointed out in the claims.

Reference is had to the accompanying drawings which form a part of this application.

Figure 2:
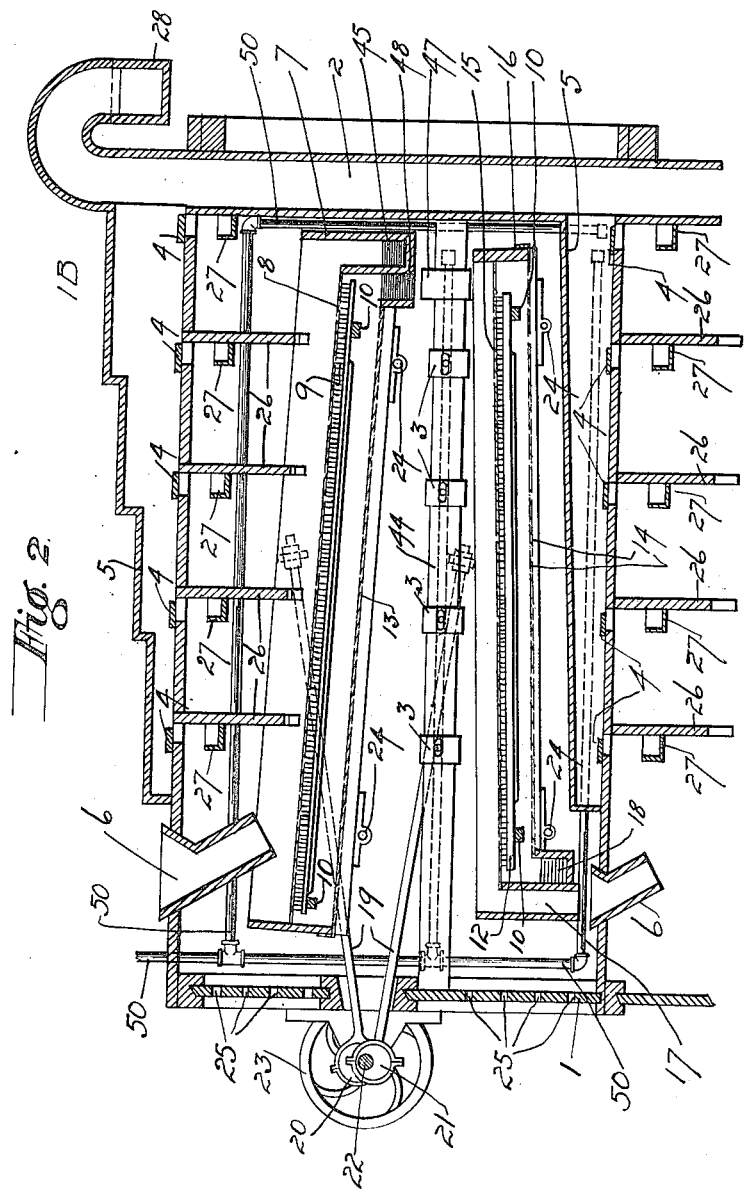
Figure 3:
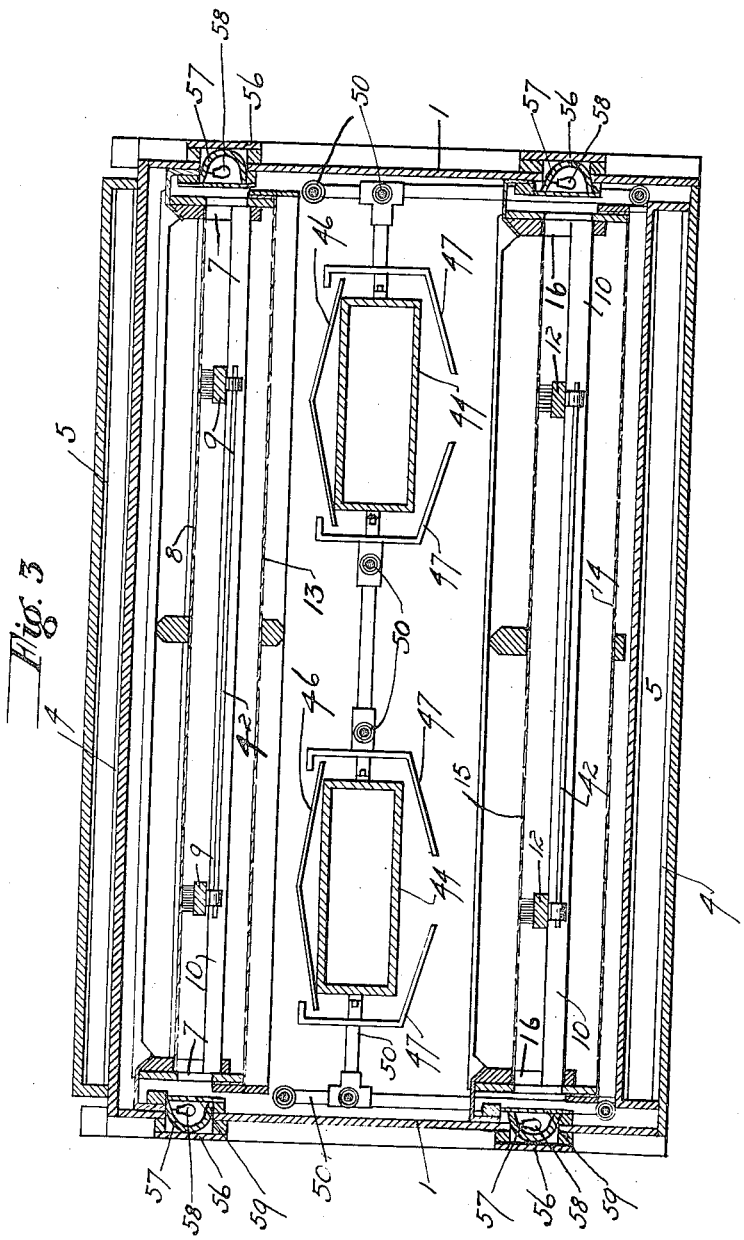
Figure 4:
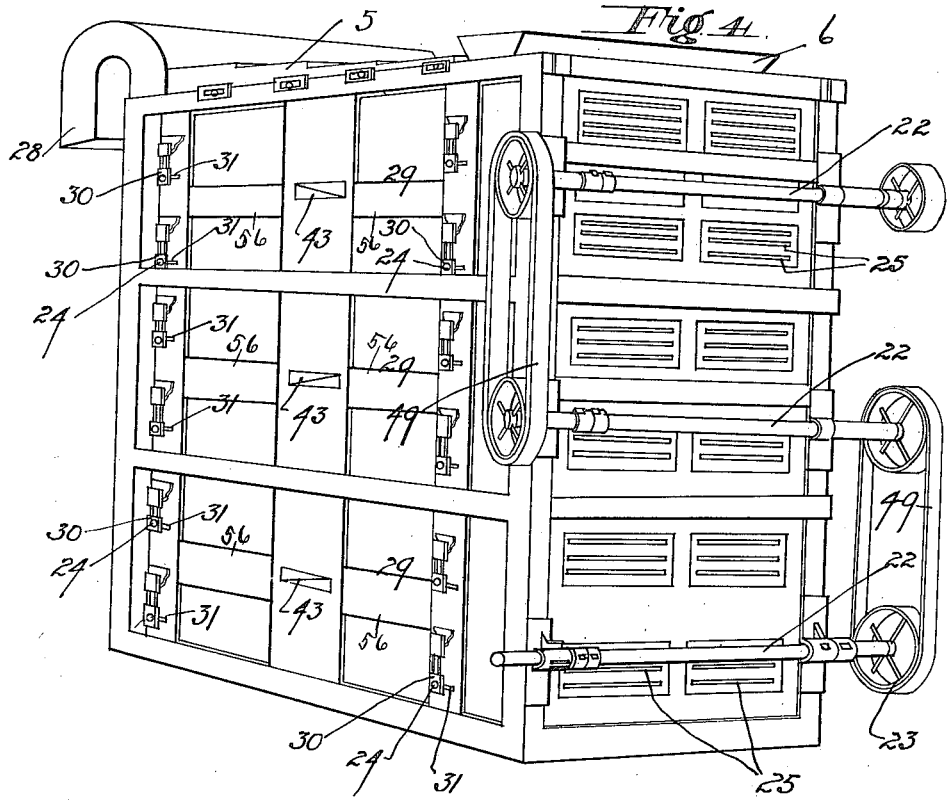
Figure 5:
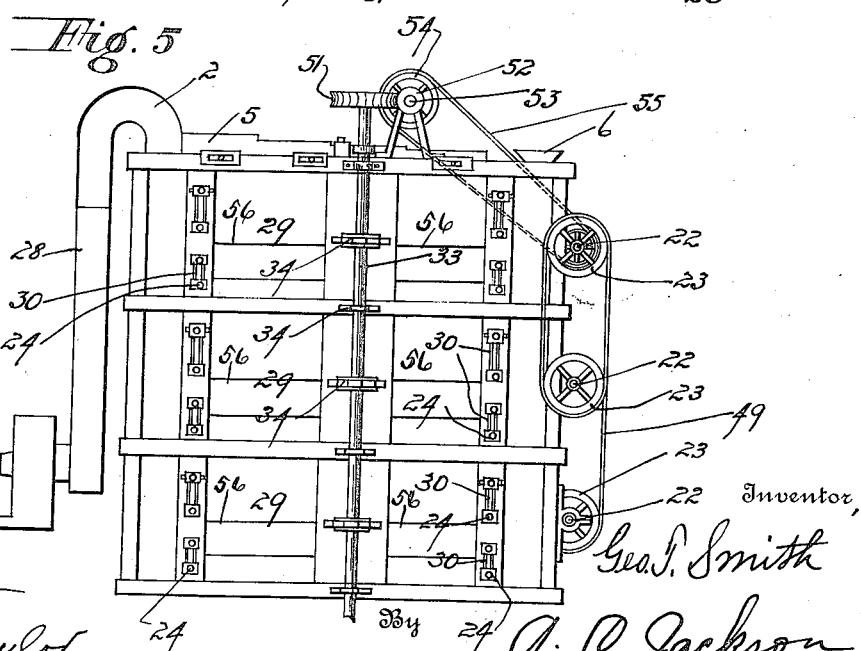

Figure 1 is a diagrammatic view of a series of grading machines and mills for manufacturing flour. Fig. 2 is a longitudinal section of one unit of one of the grading machines and a broken section of the next unit below. Fig. 3 is a vertical cross-section of one unit. Fig. 4 is a perspective view of a three unit machine. Fig. 5 is a side elevation of the same on a smaller scale. Fig. 6 is a plan view of the brushes and the means for shifting the brushes.

Similar characters of reference are used to indicate the same parts throughout the several views.

The manufacture of flour herein described includes the cleaning of the wheat and the grinding of the wheat into flour by successive partial grindings. The series of mills are indicated by two circles for each mill, as the first breaking of the wheat 1B; second breaking of the wheat 2B; third breaking of the wheat 3B; fourth breaking, 4B; second chops, 2C; first chops, 1C; germ sizer, G. S.; first middlings, 1M; second middlings, 2M; third middlings, 3M; fourth middlings, 4M; and tailings, T. The stock passes to grading machines indicated by the same characters. The mills and machines are shown only in conventional form in Fig. 1. The first four grading machines are shown with three units and the last three machines with two units each. The lines extending from the mills to the grading machines indicate the passing of the stock from each mill to the proper grading machine, and the lines extending from the sides and lower parts of the grading machines indicate the course of the broken wheat to the mills for regrinding.

One of the units shown in Fig. 1 is shown in detail in Fig. 2. The machine is provided with a casing having a slotted front, as the casing 1 with slots 25. The slots 43 hereinafter described permit air to pass into the casing. A main air flue 2 is connected with one end of the casing and branch air flues 5 and 44 are provided for each unit and connect with the main air flue 2. The casing has slots therein for valves 4 and the suction flues 44 have valves 3 to permit air to pass into the flues from the interior of the casing. A hopper 6 is provided and a spout or chute projects from the hopper into the casing. A screen holder 7 is swingingly mounted within the casing and this holder supports a screen of silk cloth 8 which is stretched and attached to the holder frame. A brush or set of brushes 9 is mounted under the screen 8 to be reciprocated with the bristles thereof rubbing against the bottom of the screen. The brushes 9 slide on bars 10 which are attached to the sides of the casing. A blank or conveyer cloth 13 is stretched and attached to the holder 7 under the screen 8 through which the finer stock passes and brushes 9 for conveying the finer stock or broken wheat to the chute 48 which delivers the stock to the upper end of another screen 15 which is stretched and attached to a holder 16 which is swingingly mounted within the casing. The coarser stock passes over screen 8 and falls down the chute 45. When the chute 48 delivers the stock to the screen 15, some of the stock will fall on the flues 44 if not prevented. For this purpose, saddles 46 which slant to each side of each flue are mounted on the flues 44 and guards 47 which are attached to the flues, direct the stock back under the flues. A second set of brushes 12 is mounted under the screen 15 for brushing the bottom of this screen and these brushes slide on bars 10. The coarser stock will pass over the screen 15 and out through a chute 17 and may be delivered to the next hopper 6 while the finer flour will pass through screen 15 to the conveyer screen 14 and from thence out a chute 18 to be dressed and bolted. The conveyer or blank screen 14 is also stretched and attached to the holder 16. The holders 7 and 16 are vibrated or shaken by rods 19 which are connected to the holders and to the eccentrics 20 and 21 which are driven by the shaft 22, and the shaft 22 may be driven by the pulley wheels 23 and belts 49. It is preferable to vibrate the holders 7 and 16 longitudinally while the brushes 9 and 12 are shifted laterally. The holders 7 and 16 are pivotally mounted on shafts 24 which are journaled in hangers 30 which are pivotally mounted. Slots 31 are cut in the casing 1 to permit the vibrating movement of the shafts 24. The slots 31 provide additional openings for air to pass into the casing 1.

Provision is made for regulating the passage of air through the machine. The passage of the air must be done with great care to secure the best results. The air for cleaning the ground wheat and flour comes in through slots 25, 31, and 43. The valves 3 and 4 are slidably mounted so that the openings can be more or less closed as may be desired. The air for cleaning the ground wheat and flour lifts the impurities out of the stock and carries the same through the branch air trunks 5 and 44 which are connected to or open into the main air trunk 2 which is to be connected to a suction fan. Partitions 26 extend across the upper interior part of the inclosure and as close down to the upper screen as may be practical for the purpose of even distribution of the air. The object is to cause an equal or constant pressure of the air suction all through the machine and co-extensive with the width of the screens herein described. The valves 3 and 4 may be more or less closed to regulate the flow of air which is carrying the impurities through the branch trunks 5 and 44 to the main air trunk 2. Deposit chambers 27 are transversely arranged in the casing and attached to the partitions 26. These deposit chambers serve as a gage for determining whether the proper amount of air is passing through the valves. A person can tell by the amount of deposit in these chambers whether the proper amount of air is passing through the valves. The impurities are taken out of the ground wheat and flour at every movement of the wheat and flour and carried through the air trunks and through a chute 28 and collected in a suitable receptacle. The above description is applicable to any one of the units marked 29. These machines are grading machines and from these machines the stock is sent to different mills according to the grade of the stock. Some flour may be taken from each unit and such flour is taken from the lowest element of each unit, as the flour passes the conveyer screen 14 through a chute or spout 18. From the mills the stock is taken to the proper grading machine. Each time the stock passes through a mill for regrinding, more black substance is loosened from the stock and in the grading machines the black substance is removed from the stock or flour at every movement of the stock or flour because the air suction is constant while the screens are being agitated or vibrated and the air passes up through the mass of the flour, carrying away the impurities and letting the flour pass on.

In order to remove the impurities thoroughly the flour should be kept thoroughly dry. For this purpose pipes 50 are circulated within the machine for using steam or heated air to dry the flour and ground wheat. By keeping the flour dry, the impurities which have been reduced to a fine powder are more certainly removed. The drier the flour and ground wheat are kept, the easier it is to take out the finely powdered black substance. The beard and other fiber from the wheat are ground into a fine powder which is lighter than the flour and wheat and this fine powder is removed with the black substance. This is one advantage of the process. The wheat can be ground more without any danger of the ground fiber remaining or being left in the flour. The process of removing the impurities is continuous and uniform in every unit of every grading machine. The flour taken from the lowest member of each unit is ready for use or dressing or bolting, having been purified as above explained. This process of purifying the flour will also bleach the flour because it is treated with air and this manner of bleaching may take the place of bleaching processes that are in use and the advantage is that it is accomplished during the manufacture of the flour. Dry flour will sift through the fine cloth screens much more freely than damp flour and will have the appearance of being dressed by much coarser silks.

Means are provided for laterally shifting the brushes 9 and 12 under the screens 9 and 15. Two brushes are fixedly spaced apart by rods 42 and the brushes move on the bars 10. Bars 41 are pivotally connected to one of the brushes. A vertical shaft 33 is provided and an eccentric 32 is provided for each set of brushes and mounted on the shaft 33 and a ring 34 is mounted on each eccentric. Each ring 34 carries a connection 35 for receiving a shifting rod 36 which carries a head 37. Lever arms 38 are pivotally mounted on bars 39 which are attached to the casing 1. The arms 38 are provided with fulcrum bolts 40 and the arms are slotted at the connection with head 37 and the other ends of the arms 38 are pivotally connected to the rods or bars 41. The eccentrics, when driven will shift the brushes laterally from side to side under the screens and brush the bottoms thereof. The casing 1 has slots 43 for the movement of the eccentrics. The eccentrics are driven by the shaft 33 which is provided with a worm gear wheel 51 which is driven by a worm 52 on shaft 53. The shaft 53 is driven by a pulley wheel 54 which is driven by a belt 55 from shaft 22.

The ground wheat and flour are continually agitated throughout the grading machines by the vibration of the screen holders. Every particle of material is treated with an air draft before it leaves a grading machine. The grading and cleaning or purifying go on simultaneously. The wheat which is not sufficiently ground to make flour is taken from the proper point in the grading machine to the proper mill for regrinding. By the time the wheat is completely reduced to flour all the black substance in the wheat will be reduced to a fine powder which is removed as above described. A series of grading machines is provided, and each grading machine has a plurality of units. Each unit is complete in itself, but coöperates with the next unit in succession, except the last, from which flour and the last grade of wheat next to flour are taken, the flour being ready for use or bolting, and the ground wheat being taken to the proper mill for regrinding. The sieves for each unit are graduated, and each unit is provided with its own means for even distribution of the suction drafts, and also for controlling the drafts.

In addition to the treatment with air for bleaching the flour the flour is treated with light and such treatment will not affect the inherent nutriment of the flour. Each unit is provided with means for treating the flour with light. See Fig. 3 of the drawings. Pockets 56 are provided in the sides of the casing and reflectors 57 are mounted in the pockets to throw the light in the path of the falling flour. Light producing means, such as incandescent globes 58, are positioned relative to the reflectors 57 so that light direct from the globes and from the reflectors will be thrown in the path of the falling flour. By the time the material passes through all the units, every particle of the flour will have been treated several times. Sheets of isinglass 59 may be placed between the reflectors 57 and the interior of the machine to prevent the flour from accumulating on the reflectors. Other transparent means may be used for the same purpose. Two reflectors are provided in each side of each unit. It is apparent that the lights may be positioned at different places for bleaching purposes.

What I claim is,—

1. A flour purifier comprising a series of units, a series of sieves movable in each unit, a casing for said units having slots in one end for the admission of air and an air trunk closing the other end, and means in each unit for forcing a slight draft of air through said sieves uniformly throughout each unit, consisting of an air box mounted on said casing and communicating with said air trunk, a branch air trunk for each unit connected with the first mentioned air trunk, valves for said branch air trunk, and means for regulating said valves.

2. A flour purifier comprising a series of units, a series of sieves movable in each unit, a casing for said units having slots for the admission of air, a main air trunk, branch air trunks for each unit connected to said main air trunk for forcing slight drafts of air through said sieves and uniformly throughout each unit, and means for regulating the draft through said air trunks.

3. A flour purifier having a casing constructed into a series of units, reciprocating sieves swingingly mounted in each unit for moving partially ground wheat and flour in relatively thin layers, a chute for each sieve, an air trunk for each unit, vertical partitions extending across the upper part of the casing for each unit for causing even distribution of the air draft throughout each unit, said casing having slots for the admission of air, valves for controlling the passage of air through said trunks, a deposit chamber attached to said partitions and operatively disposed relative to said valves for determining the force of said air drafts through said passages.

4. A flour purifier comprising a series of units, a casing therefor, reciprocating sieves and chutes swingingly mounted on each unit, air trunks for forcing slight air drafts through each sieve, said casing having slots for the admission of air therethrough, a plurality of partitions vertically disposed in said casing for the even distribution of the air drafts throughout each unit, and valves for said air trunks, said branch air trunks being connected to said main air trunk and coöperating with said partitions, and means in connection with said partitions for determining the force of air passing through said valves.

5. A flour purifier having a series of units, a casing therefor, reciprocating sieves and chutes swingingly mounted in each unit for moving partially ground wheat and flour in relatively thin layers, means for creating a slight draft of air uniformly and through each sieve throughout each unit, means for controlling and distributing the draft in each unit consisting of vertically disposed partitions, a valve coöperating with each partition, and a deposit chamber carried by each partition operatively disposed relative to each valve for determining the force of the draft through each valve.

6. A flour purifier having a casing divided into a series of units, a plurality of holders for each unit swingingly mounted in said casing, graduated sieves mounted in said holders, a set of brushes mounted under each sieve, a main air trunk, branch air trunks in each unit connected to said main air trunk for forcing slight drafts of air through each sieve and uniformly throughout each unit, and means for laterally reciprocating said brushes to brush the bottoms of said sieves, consisting of a vertical shaft, rings, levers operatively connected to said rings and said brushes and eccentrics engaged by said rings and carried by said shaft for operating said rings.

7. A flour purifier having a casing divided into a series of units, reciprocating sieves for each unit movable longitudinally in said casing, a main air trunk, and branch air trunks connected to said main air trunk for forcing slight drafts of air through each sieve and uniformly throughout each unit and means for laterally reciprocating said brushes against the bottoms of said sieves consisting of bars attached to said casing for supporting said brushes, levers fulcrumed on said bars and operatively connected with said brushes, eccentrics operatively connected with said levers, and means for driving said eccentrics.

8. A flour purifier having a casing, sieves mounted in said casing, brushes mounted in said casing for brushing the bottom of said sieves, and means for operating said brushes consisting of a vertically disposed shaft, means for driving said shaft, bars supporting said brushes, levers fulcrumed on said bars, bars attached to said brushes and pivotally to said levers, rings, heads carried by said rings and pivotally connected to said levers, and eccentrics carried by said shaft for operating said rings.

9. A flour purifier having a casing, sieves mounted in said casing, brushes mounted in said casing for brushing the bottom of said sieves, and means for operating said brushes consisting of a vertically disposed shaft, bars attached to said casing for supporting said brushes, levers fulcrumed on said bars and connected to said brushes and having slotted ends, rings operatively connected to said shaft and heads carried by said rings and pivotally connected to the slotted ends of said levers, and eccentrics carried by said shaft for operating said rings.

10. A flour purifier comprising a series of units, a casing therefor having slots for the admission of air to said units, means in each unit for moving masses of partially ground wheat and flour in relatively thin layers, and means operatively connected with said casing and with said units for forcing slight drafts of air through each moving layer and uniformly throughout each unit.

11. A flour purifier comprising a series of units, a casing therefor having slots for admission of air to said units, sieves disposed at slight inclines and swingingly mounted in each unit for moving the flour in masses of relatively thin layers, and means operatively connected with said casing for forcing slight drafts of air through each moving layer uniformly throughout each unit.

12. A flour purifier having a series of units, a casing therefor, means for creating slight constant drafts of air throughout each unit consisting of a main air trunk, branch air trunks in each unit communicating with said main air trunk, means for controlling the passage of air through said branch air trunks, sieves mounted in each unit, a reciprocating holder for each sieve swingingly mounted in said casing, brushes for brushing the bottom of said sieves, and means for preventing stock from falling on said branch air trunks.

13. A flour purifier having a casing, a series of graduated sieves, reciprocating holders for said sieves swingingly mounted in said casing for moving masses of stock in relatively thin layers, means for creating a slight draft through all of said sieves and said layers uniformly, and pipes circulated about said sieves within said casing for heating the air within said casing.

14. A flour purifier having a casing, a series of graduated sieves, reciprocating holders for said sieves swingingly mounted in said casing for moving masses of stock in relatively thin layers, means for creating a slight draft through all of said moving layers uniformly, and means for heating the air within said casing about and between said sieves.

15. A flour purifier having a casing, a series of sieves mounted in said casing for moving masses of stock in relatively thin layers, reciprocating holders for said sieves swingingly mounted in said casing, one sieve being disposed below the other, means for creating a slight draft through all of said moving layers uniformly, and means for heating the air through which material is falling from one sieve to the other and which is passing through said layers.

16. A flour purifier having a casing, a series of graduated sieves for moving stock in relatively thin layers, one superposed above the other, a reciprocating holder for each sieve swingingly mounted in said casing, means for heating the material with air as it falls from one sieve to another and while traveling on said sieves consisting of air trunks provided with suitable valves, means for creating suction through all of said sieves and air trunks uniformly, and means for heating the air while passing through the material moving on said sieves, and from one sieve to another.

17. A flour purifier having a casing, a series of sieves, one superposed above the other, a reciprocating holder for each sieve swingingly mounted in said casing, means for treating the material moving on said sieves and falling from one sieve to another with light, and means for circulating and heating air within said casing.

18. A flour purifier having a casing, a series of graduated sieves, one superposed above another, a reciprocating holder for each sieve swingingly mounted in said casing for causing material to move on said sieves and to fall from one sieve to another, and means for projecting rays of light through the material falling from one sieve to another.

19. A flour purifier having a casing, a series of graduated sieves, one superposed above another, a reciprocating holder for each sieve swingingly mounted in said casing for causing material to move in relatively thin layers on said sieves, and to fall from one sieve to another, means for forcing slight drafts of air through said layers while moving on said sieves and from one sieve to another, consisting of air trunks provided with suitable valves located between said sieves, and means for preventing the material from falling on said air trunks.

20. A flour purifier having a casing, a series of graduated sieves mounted in said casing, one superposed above another, a light producing means positioned within said casing for treating the material with the rays of light while traveling on said sieves and falling from one sieve to another.

21. A flour purifier comprising a series of units, means in each unit for grading stock, and means for bleaching the stock while being graded, consisting of means for treating the stock with air and with light.

22. A flour purifier comprising a series of units, means in each unit for grading stock, and means for bleaching the stock while being graded, consisting of means for treating the stock with air and light and heat.

In testimony whereof, I set my hand in the presence of two witnesses, this 27th day of November, 1912.

GEORGE T. SMITH.

Witnesses:
A. L. JACKSON,
E. W. ROCHESTER.